US012679469B2

(12) United States Patent　　　(10) Patent No.:　US 12,679,469 B2

Nagasawa　　　　　　　　　　　(45) Date of Patent:　　　Jul. 14, 2026

(54) VEHICLE BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 254 days.

(21) Appl. No.: 18/762,137

(22) Filed: Jul. 2, 2024

(65) Prior Publication Data

US 2025/0026412 A1　　Jan. 23, 2025

(30) Foreign Application Priority Data

Jul. 18, 2023　(JP) ................................. 2023-116809

(51) Int. Cl.
　*B62D 25/00*　　　(2006.01)
　*B62D 25/08*　　　(2006.01)

(52) U.S. Cl.
　CPC ......... *B62D 25/088* (2013.01); *B62D 25/084* (2013.01)

(58) Field of Classification Search
　CPC ............................ B62D 25/088; B62D 25/084
　USPC ................................................... 296/203.02
　See application file for complete search history.

(56) References Cited

U.S. PATENT DOCUMENTS 8,888,168　B2 *　11/2014　Kuwabara ............ B62D 25/082
　　　　　　　　　　　　　　　　　　　296/187.1
12,325,465　B2 *　6/2025　Tashiro ................... B60R 19/34
2021/0331640　A1 *　10/2021　Iwamoto ................ B60R 19/26

FOREIGN PATENT DOCUMENTS

JP　　　　2014-104898　A　　6/2014

* cited by examiner

*Primary Examiner* — Steven O Douglas
(74) *Attorney, Agent, or Firm* — Smith, Gambrell & Russell, LLP

(57)　　　　　ABSTRACT

A vehicle body front structure includes: front side frames extending in a front-rear direction of a vehicle body on left and right sides of the vehicle body; upper side frames disposed on both sides of a power unit room in a vehicle width direction; a radiator support disposed in a front portion of the power unit room and joined to front ends of the upper side frames; and a lower frame disposed below and supported by the front side frames; lower side frame extension members in a pair extending from a front end of the lower frame toward the vehicle body's front and having a front end portion protruding forward of the radiator support; and gussets in a pair extending from the front end of the lower frame toward the vehicle body's front and having front ends outside front ends of the front side frames in the vehicle width direction.

7 Claims, 9 Drawing Sheets

VEHICLE BODY FRONT STRUCTURE

CROSS-REFERENCE TO RELATED APPLICATIONS

The present application claims priority from Japanese Patent Application No. 2023-116809 filed on Jul. 18, 2023, the entire contents of which are hereby incorporated by reference.

BACKGROUND

The disclosure relates to a vehicle body front structure including frames disposed around a radiator support and a lower frame disposed in below front side frames.

In recent years, there is a demand for improved safety in a vehicle body structure of an automobile or the like against an offset collision in which the vehicle partially collides with an obstacle. For example, there is a demand for performance improvement against, among offset collisions, what is called a small-overlap frontal collision in which an obstacle collides only at an end in a vehicle width direction.

Conventionally, various technologies have been proposed as a vehicle body front structure that reduces deformation of a vehicle body in response to such a small-overlap frontal collision. For example, Japanese Unexamined Patent Application Publication (JP-A) No. 2014-104898 discloses a vehicle body front structure in which each front side member (front side frame) and a suspension member are coupled by a V-shaped brace. With such a configuration, the vehicle body front structure of JP-A No. 2014-104898 suppresses the front side frame from falling inward in the vehicle width direction at the time of a minute-lap collision (small-overlap frontal collision). Thus, the vehicle body front structure of JP-A No. 2014-104898 can reduce deformation of the vehicle body by generating a lateral force in the vehicle at the time of a minute-lap collision.

SUMMARY

An aspect of the disclosure provides a vehicle body front structure. The vehicle body front structure includes front side frames in a pair, upper side frames in a pair, a radiator support, and a lower frame. The front side frames extends in a front-rear direction of a vehicle body on a left side and a right side of the vehicle body respectively. The frames are disposed respectively on both sides of a power unit room in a vehicle width direction and extends along the power unit room. The radiator support is disposed in a front portion of the power unit room and is joined to respective front ends of the upper side frames. The lower frame is disposed below the front side frames and supported by the front side frames. The vehicle body front structure includes lower side frame extension members in a pair, and gussets in a pair. The lower side frame extension members extend from a front end of the lower frame toward a front side of the vehicle body and has a front end portion protruding forward of the radiator support. The gussets extends from the front end of the lower frame toward the front side of the vehicle body and has a front end disposed outside a front end of a corresponding one of the front side frames in the vehicle width direction.

With the vehicle body front structure of the disclosure, deformation of a vehicle body can be suppressed against both a full-wrap frontal collision and a small-overlap frontal collision.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 3 is a side view illustrating the frame structure of the front portion of the vehicle body;

FIG. 6 is a side view illustrating behavior of the frame of the front portion of the vehicle body at a final stage of the full-wrap frontal collision;

FIG. 8 is a plan view illustrating behavior of the frame of the front portion of the vehicle body at a middle stage of the small-overlap frontal collision; and FIG. 9 is a plan view illustrating behavior of the frame of the front portion of the vehicle body at a final stage of the small-overlap frontal collision.

DETAILED DESCRIPTION

Figure 1:
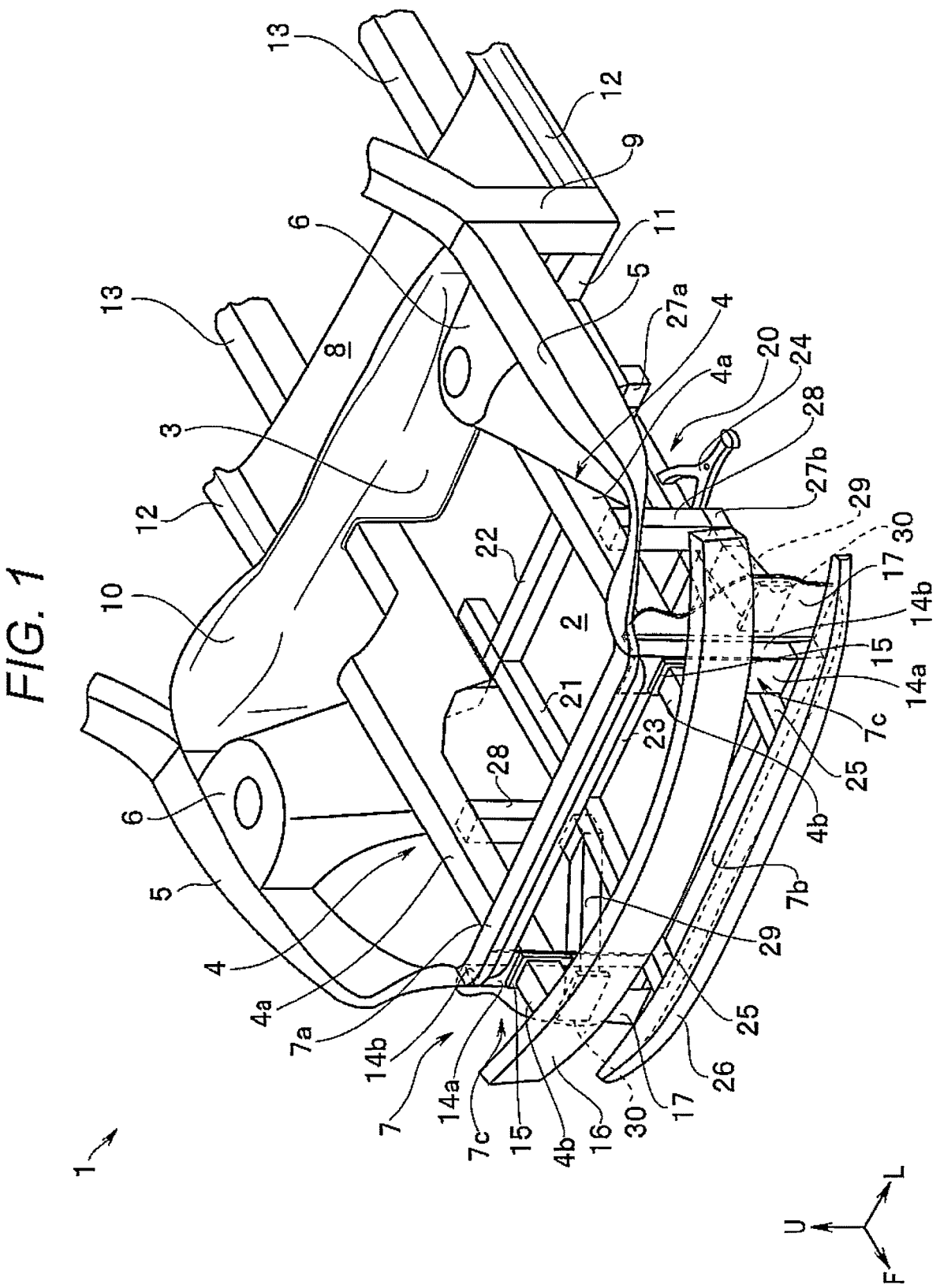
FIG. 1 is a perspective view illustrating a frame structure of a front portion of a vehicle body.

In the case of the structure disclosed in JP-A No. 2014-104898, for example, it may be insufficient to generate lateral force to the vehicle body depending on the magnitude of impact at the time of a small-overlap frontal collision. In such a case, a collision load concentrates on a small-overlap portion of a front portion of the vehicle body (an outer portion of a front side frame in a vehicle width direction), and deformation of the vehicle body may not be sufficiently reduced. In addition, even at the time of a full-wrap frontal collision, there is a possibility that the deformation of the vehicle body cannot be sufficiently reduced due to buckling deformation of the V-shaped brace depending on the magnitude of the impact.

The disclosure has been made in view of the above circumstances, and it is desirable to provide a vehicle body front structure capable of suppressing deformation of a vehicle body against both a full-wrap frontal collision and a small-overlap frontal collision.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Note that, in the drawings used in the following description, scales are different for each component in order to make each component recognizable in the drawings. Therefore, the disclosure is not limited only to the illustrated form with respect to the quantities of components, the shapes of components, the ratios of the sizes of components, the relative positional relationship of components, and the like described in these drawings.

As an example of the vehicle body front structure according to the present embodiment, a configuration of a vehicle front portion of a vehicle in which a power unit such as an electric motor is mounted in front of a cabin will be described. Note that, in the following description, in a case where "joining" is described, the joining method is performed using a joining means represented by fusion welding, mechanical joining, or the like.

As illustrated in FIG. 1, a vehicle body 1 includes a power unit room 2 in a front portion.

The vehicle body 1 includes a toe board 3, a pair of front side frames 4, a pair of upper side frames 5, a pair of suspension towers 6, and a radiator support 7 as frames forming the power unit room 2.

The toe board 3 extends in the vehicle width direction as a partition wall that partitions a cabin 8 and the power unit room 2. Both ends of the toe board 3 in the vehicle width direction are joined to a pair of left and right front pillars 9 constituting the vehicle body 1. Further, an upper end of the toe board 3 is joined to a bulkhead 10 extending in the vehicle width direction along the toe board 3.

The pair of front side frames 4 extends from a lower side of the toe board 3 toward a front side of the vehicle body 1 outside a center portion of the toe board 3 in the vehicle width direction.

Each of these front side frames 4 is configured by coupling frame members.

For example, each front side frame 4 includes, for example, a front side frame main body 4a and a crash box 4b. The front side frame main body 4a and the crash box 4b have a substantially rectangular cross section.

A torque box 11 is provided at a rear end of the front side frame main body 4a. A rear end portion of the front side frame 4 is joined to a front end portion of a side sill 12 and a front end portion of a floor side frame 13 with the torque box 11 interposed therebetween.

Figure 2:
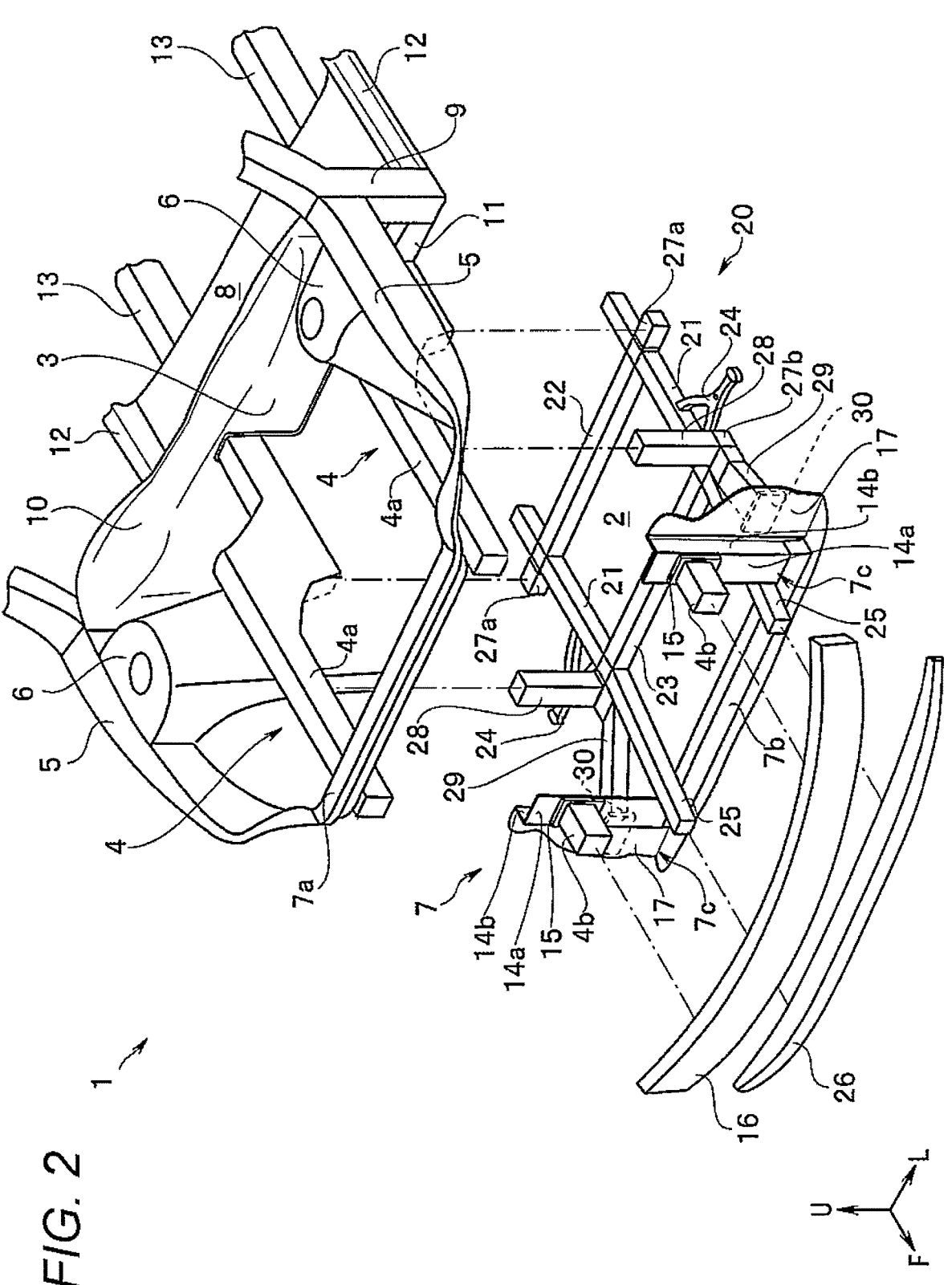
FIG. 2 is an exploded perspective view illustrating the frame structure of the front portion of the vehicle body.
Figure 3:
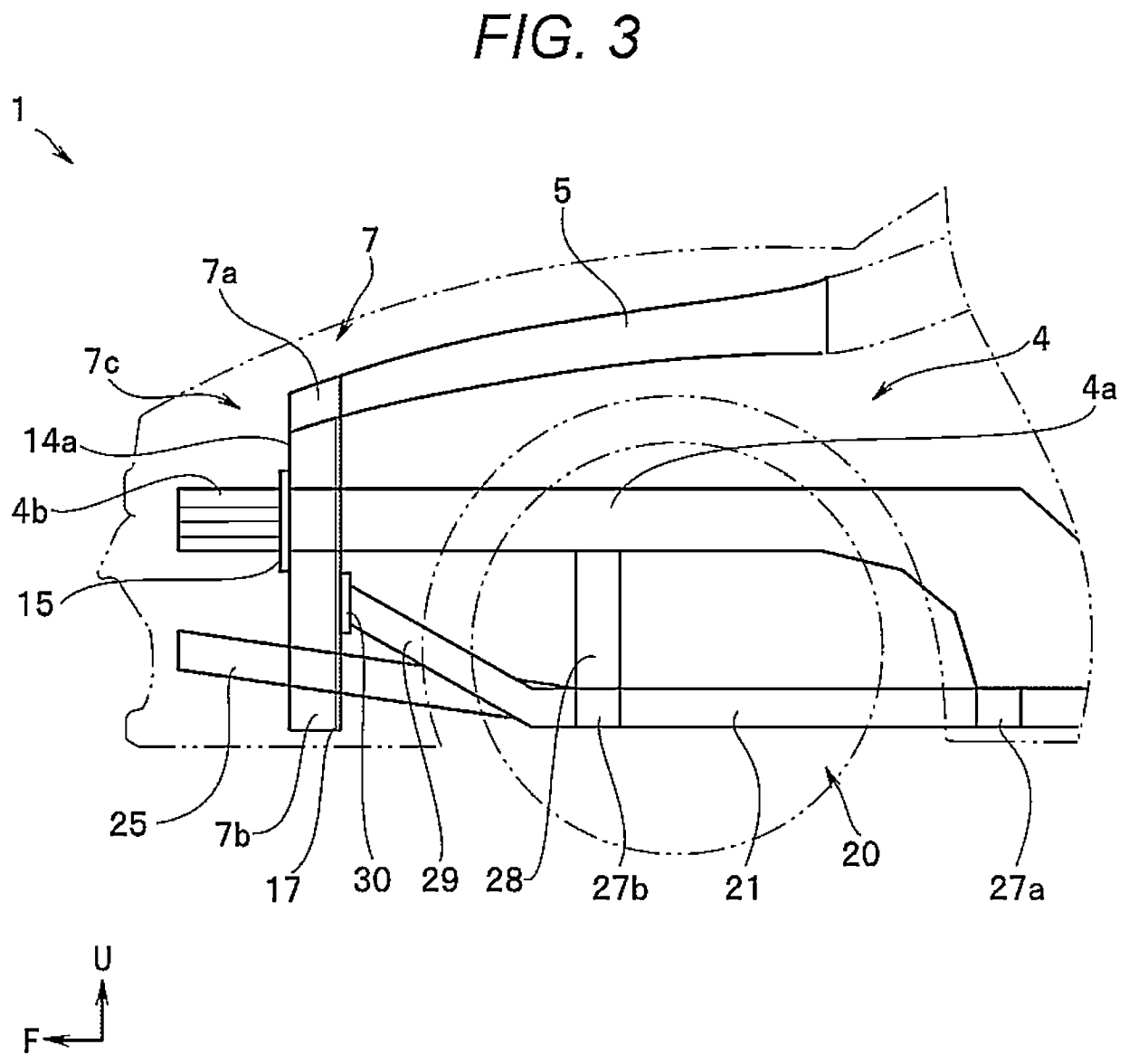

As illustrated in FIGS. 2 and 3, a front end of the front side frame main body 4a is joined to a radiator support side 7c of the radiator support 7 to be described later. Note that a joining position of the front end of the front side frame main body 4a to the radiator support side 7c is set slightly above a center of the radiator support side 7c in an up-down direction.

As illustrated in FIG. 3, the crash box 4b is coupled to the front end of the front side frame main body 4a with the radiator support side 7c interposed therebetween.

For example, the crash box 4b includes a mounting flange 15. The mounting flange 15 is formed at a rear end of the crash box 4b.

The mounting flange 15 is positioned with respect to the radiator support side 7c facing the front end of the front side frame main body 4a. In this state, the mounting flange 15 of the crash box 4b is joined to the radiator support side 7c. Thus, the crash box 4b extends to the front portion of the vehicle body 1 beyond the radiator support side 7c.

A front end portion of the crash box 4b thus extended is joined to a bumper beam 16 extending in a curved manner in the vehicle width direction (see FIG. 1).

With these configurations, each front side frame 4 serves as an energy absorbing member that absorbs a collision load and disperses the collision load to the side sill 12 and the floor side frame 13 via the torque box 11 in the event of a full-wrap frontal collision.

The pair of upper side frames 5 is disposed on both sides of the power unit room 2 in the vehicle width direction. Each upper side frame 5 extends from the bulkhead 10 to the front side of the vehicle body along the power unit room 2. Each upper side frame 5 is curved inward in the vehicle width direction from a middle position of each upper side frame 5 toward the front side of the vehicle body. The front end of each upper side frame 5 is joined to both sides of a radiator support upper 7a described later.

That is, each upper side frame 5 is curved so as to be gradually narrowed inward in the vehicle width direction from the rear end toward the front end.

The pair of suspension towers 6 is provided between each front side frame 4 and each upper side frame 5. Each suspension tower 6 is formed to protrude inward in the vehicle width direction of the power unit room 2. A suspension apparatus (not illustrated) is attached inside each suspension tower 6. An upper portion of the suspension apparatus is supported by the suspension tower 6. Note that a coupling member 28 to be described later is disposed in front of each suspension tower 6 configured as described above.

Figure 4:
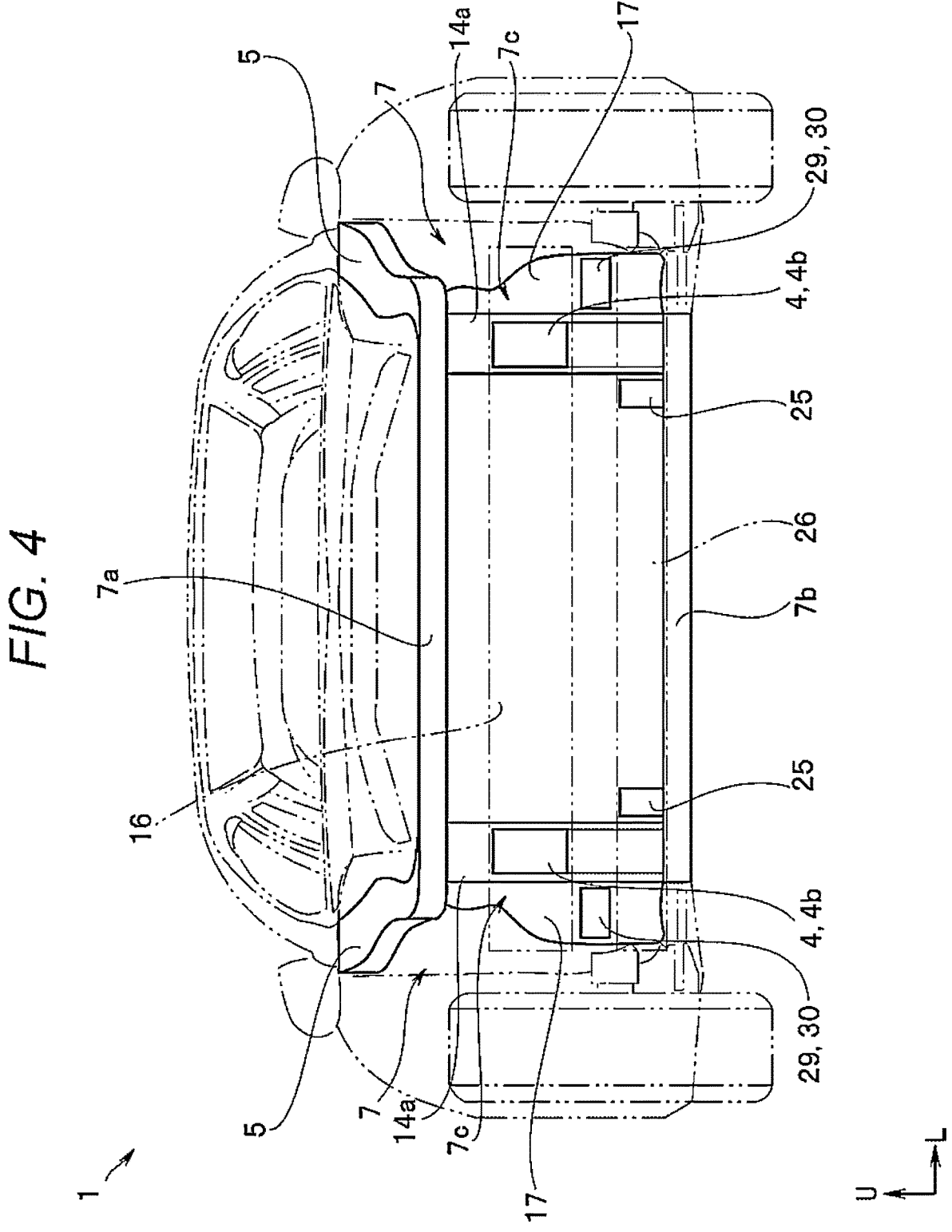
FIG. 4 is a front view illustrating the frame structure of the front portion of the vehicle body.

As illustrated in FIGS. 1 and 4, the radiator support 7 is disposed substantially at a center of a front portion of the power unit room 2 of the vehicle body 1. The radiator support 7 is formed in a substantially rectangular frame shape in a front view.

For example, the radiator support 7 includes a pair of upper and lower radiator support upper 7a and radiator support lower 7b, and a pair of left and right radiator support sides 7c.

The radiator support upper 7a and the radiator support lower 7b are formed in, for example, a substantially hat-shaped cross section protruding upward. The radiator support upper 7a and the radiator support lower 7b face each other at a predetermined interval in the up-down direction of the vehicle body.

As illustrated in FIGS. 1 and 2, the radiator support upper 7a extends in the vehicle width direction at the front portion of the vehicle body. Both ends of the radiator support upper 7a in the vehicle width direction are joined to the front ends of the upper side frames 5 as described above.

The radiator support lower 7b extends in the vehicle width direction below the radiator support upper 7a. Note that an upper surface of the radiator support lower 7b is slightly inclined upward toward the front.

The pair of radiator support sides 7c is opposed to each other with a predetermined interval in the vehicle width direction. As illustrated in FIG. 2, each of the radiator support sides 7c has, for example, a substantially L-shaped cross section having wall plates on a front and an outside in the vehicle width direction.

For example, the radiator support side 7c includes a front wall plate 14a and a side wall plate 14b.

The front wall plate 14a extends in the up-down direction. As described above, the front end of the front side frame main body 4a is joined to a back surface of the front wall plate 14a. A rear end of the crash box 4b is joined to a surface of the front wall plate 14a.

The side wall plate 14b is disposed in an L shape backward from an outer edge of the front wall plate 14a in the vehicle width direction. A radiator support side flange 17 extending outward in the vehicle width direction is provided at a rear edge of the side wall plate 14b (see FIGS. 2 and 4).

The interval inside in the vehicle width direction between the radiator support sides 7c configured as described above is set to be substantially equal to an interval outside in the vehicle width direction between a pair of lower side frame extension members 25 to be described later. The upper end and the lower end of each radiator support side 7c are joined to both sides of the radiator support upper 7a and the radiator support lower 7b.

With these configurations, the radiator support 7 serves as a support member that supports a radiator (not illustrated), frame members extending in the front-rear direction of the vehicle body, and the like.

As illustrated in FIG. 2, a lower frame 20 is disposed at a bottom portion of the power unit room 2 configured as described above. For example, the lower frame 20 is set substantially equal to the height of the radiator support lower 7b in a front view. The lower frame 20 includes frames.

For example, the lower frame 20 includes a pair of left and right lower side frames 21, and a pair of front and rear rear cross members 22 and front cross member 23. The pair of lower side frames 21 and the pair of cross members 22 and 23 have a substantially rectangular cross section.

The pair of lower side frames 21 extends in the front-rear direction of the vehicle body at a predetermined interval in the vehicle width direction. The lower side frames 21 are disposed inward from the front side frames 4 in the vehicle width direction. Further, a suspension arm 24 is attached to an outer surface of each of the lower side frames 21 in the vehicle width direction. These suspension arms 24 are supported by the lower frame 20 so as to be swingable in the up-down direction.

The pair of rear cross member 22 and front cross member 23 extends inward from the lower side frames 21 in the vehicle width direction with a predetermined interval between a rear portion and a front portion of the lower frame 20.

On both sides in the vehicle width direction of the rear cross member 22 and the front cross member 23, a pair of left and right support members 27a and a pair of left and right support members 27b protrude.

As illustrated in FIG. 2, the pair of support members 27a constitutes the rear portion of the lower frame 20 together with the rear cross member 22. The support members 27a each extend outward in the vehicle width direction of the lower side frame 21. A length of the support member 27a extending outward in the vehicle width direction is set to a length facing a bottom surface of the front side frame 4 disposed outside the lower side frame 21. That is, each of the support members 27a is set to have such a length that an upper surface of each of the support members 27a can abut on the bottom surface of the front side frame 4.

As illustrated in FIG. 2, the pair of support members 27b constitutes a front portion of the lower frame 20 together with the front cross member 23. The support members 27b extend outward in the vehicle width direction of the lower side frame 21. The length of the support member 27b extending outward in the vehicle width direction is set to a length facing the bottom surface of the front side frame 4 disposed outside the lower side frame 21.

Each of the support members 27b includes a coupling member 28 above each of the support members 27b.

As illustrated in FIGS. 2 and 3, each of the coupling members 28 extends upward from each of the support members 27b. These coupling members 28 are disposed in front of the suspension tower 6.

For example, each coupling member 28 extends upward in a state where a bottom surface of each coupling member 28 is joined to an upper surface of each support member 27b. The length of each of the coupling members 28 extending upward is set to such a length as to be able to abut on the bottom surface of the front side frame 4 when each of the support members 27a abuts on the bottom surface of the front side frame 4.

The lower frame 20 is supported by the front side frames 4 by joining the upper surfaces of the support members 27a and the coupling members 28 to the bottom surfaces of the front side frames 4 in contact with each other. Note that, for example, a power unit (not illustrated) is supported on an upper surface of the front cross member 23 with a motor mount (not illustrated) interposed therebetween.

The lower frame 20 thus configured includes a pair of left and right lower side frame extension members 25 and a pair of left and right gussets 29 at its front portion.

As illustrated in FIG. 4, the pair of lower side frame extension members 25 is disposed inward from the front side frames 4 in the vehicle width direction. As illustrated in FIG. 3, each lower side frame extension member 25 extends from a front end of the lower frame 20 toward the front side of the vehicle body. A front end portion of each lower side frame extension member 25 passes through the frame of the radiator support 7 and protrudes forward of the radiator support 7.

For example, each lower side frame extension member 25 extends obliquely upward from a rear end to a front end of the lower side frame extension member 25, for example. As illustrated in FIGS. 3 and 4, the front end portions of the lower side frame extension members 25 pass by the upper surface of the radiator support lower 7b of the radiator support 7 and inward from each of the radiator support sides 7c in the vehicle width direction. Each of the front end portions of the lower side frame extension members 25 having passed through the frame of the radiator support 7 in this manner protrudes forward of the radiator support 7.

Each of the lower side frame extension members 25 extended in this manner is joined in the frame of the radiator support 7 in a state where a lower surface of the lower side frame extension member 25 abuts on the upper surface of the radiator support lower 7b. Note that the joining means for joining each of the lower side frame extension members 25 to the radiator support lower 7b may be joining by a bracket.

Each of the front ends of the lower side frame extension members 25 is joined to a lower beam 26 extending in a curved manner in the vehicle width direction (see FIG. 1).

With these configurations, the lower side frame extension member 25 can stiffen the front portion of the vehicle body by the reaction force of the lower frame 20 supported by the front side frame 4 in a full-wrap frontal collision.

As illustrated in FIG. 2, the pair of gussets 29 extends toward the front side of the vehicle body from the front end of the lower frame 20 at a front portion of the coupling member 28. A front end of each gusset 29 is disposed outside the front end of the front side frame 4 in the vehicle width direction.

For example, in each gusset 29, a rear portion of the gusset 29 is joined to an outside of the lower side frame extension member 25 in the vehicle width direction and to a front surface of the support member 27b. In this manner, each gusset 29 joined to the front end of the lower frame 20 extends toward the radiator support side flange 17. As illustrated in FIGS. 2 and 3, for example, a mounting flange 30 is formed at the front end of each gusset 29.

The front end of each gusset 29 is joined to the radiator support side flange 17 in a state where the mounting flange 30 is in contact with a back surface of the radiator support side flange 17.

Thus, the front end of each gusset 29 is disposed outside the front end of the front side frame 4 in the vehicle width direction and behind the front ends of the front side frame 4 and the lower side frame extension member 25 in the vehicle body (see FIGS. 3 and 4). In addition, as illustrated in FIG. 4, the front end of each gusset 29 is disposed lower than the front end of the front side frame 4 and higher than the front end of the lower side frame extension member 25 in the up-down direction of the vehicle body 1.

That is, the front end of each gusset 29 is disposed between the front end of the front side frame 4 and the front end of the lower side frame extension member 25 in the vehicle body up-down direction, and is disposed outside the front end of the front side frame 4 in the vehicle width direction.

With these configurations, the gusset 29 can stiffen the front portion of the vehicle body by the reaction force of the lower frame 20 supported by the front side frame 4 at the time of full-wrap frontal collision. Furthermore, the gusset 29 serves as a starting point for applying a lateral force to the vehicle body 1 in the event of a small-overlap frontal collision.

According to such an embodiment, in the vehicle body front structure including the pair of left and right front side frames 4 extending in the front-rear direction of the vehicle body 1, the pair of upper side frames 5 disposed on both sides of the power unit room 2 in the vehicle width direction and extending along the power unit room 2, the radiator support 7 disposed in the front portion of the power unit room 2 and joined to front ends of the pair of upper side frames 5, and the lower frame 20 disposed in below the pair of front side frames 4 and supported by the pair of front side frames 4, the vehicle body front structure includes the pair of lower side frame extension members 25 extending from the front end of the lower frame 20 toward the front side of the vehicle body and having the front end portion protruding forward of the radiator support 7, and the pair of gussets 29 extending from the front end of the lower frame 20 toward the front side of the vehicle body and having front ends disposed outside the front ends of the pair of front side frames 4 in the vehicle width direction. With these configurations, the vehicle body front structure can suppress deformation of the vehicle body 1 against both the full-wrap frontal collision and the small-overlap frontal collision.

That is, the vehicle body front structure includes the lower frame 20 supported by the pair of front side frames 4. The pair of lower side frame extension members 25 and the pair of gussets 29 for stiffening the front portion of the vehicle body are provided at the front end of the lower frame 20.

Figure 5:
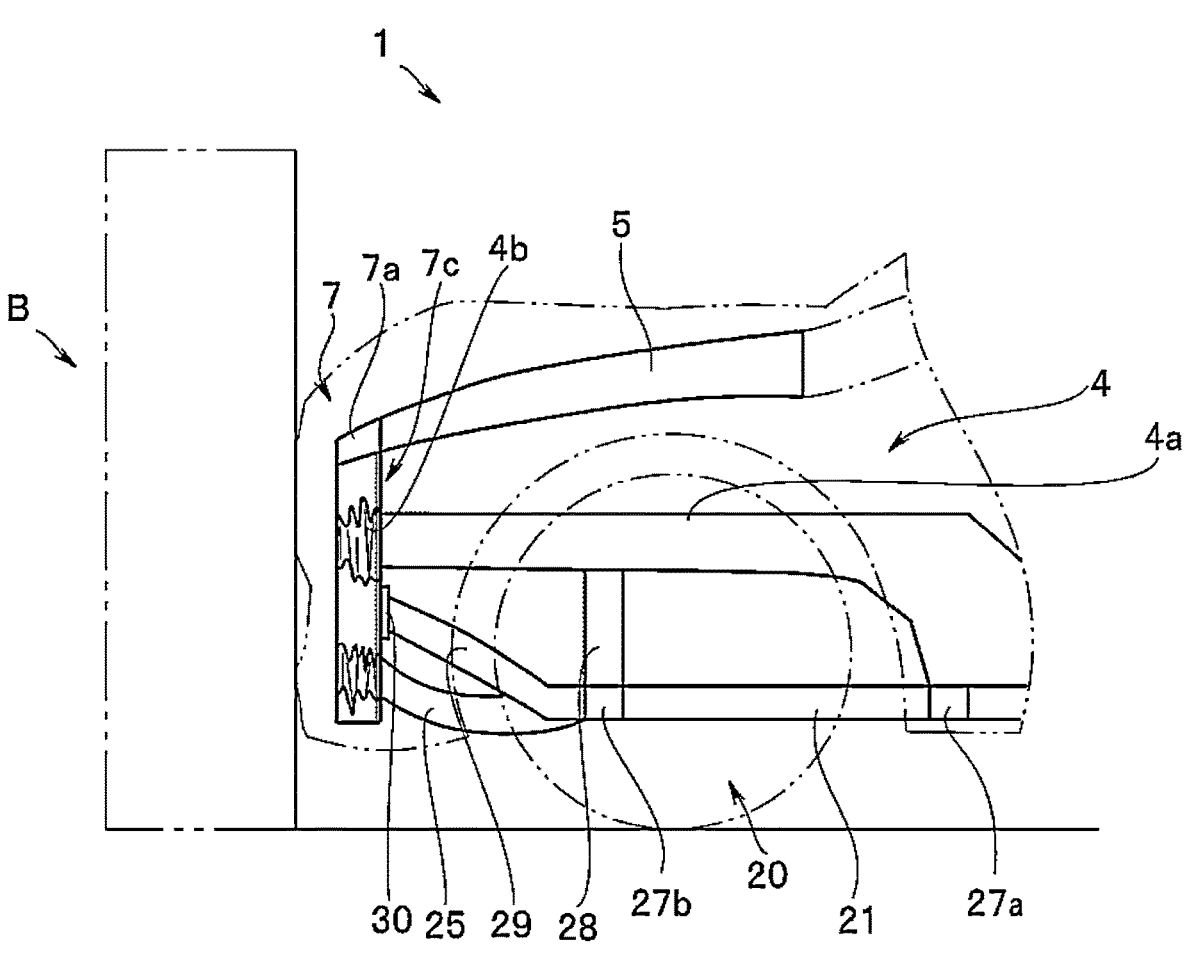
FIG. 5 is a side view illustrating behavior of a frame of the front portion of the vehicle body from an initial stage of a full-wrap frontal collision to a middle stage of the collision.
Figure 5:
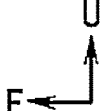
Figure 6:
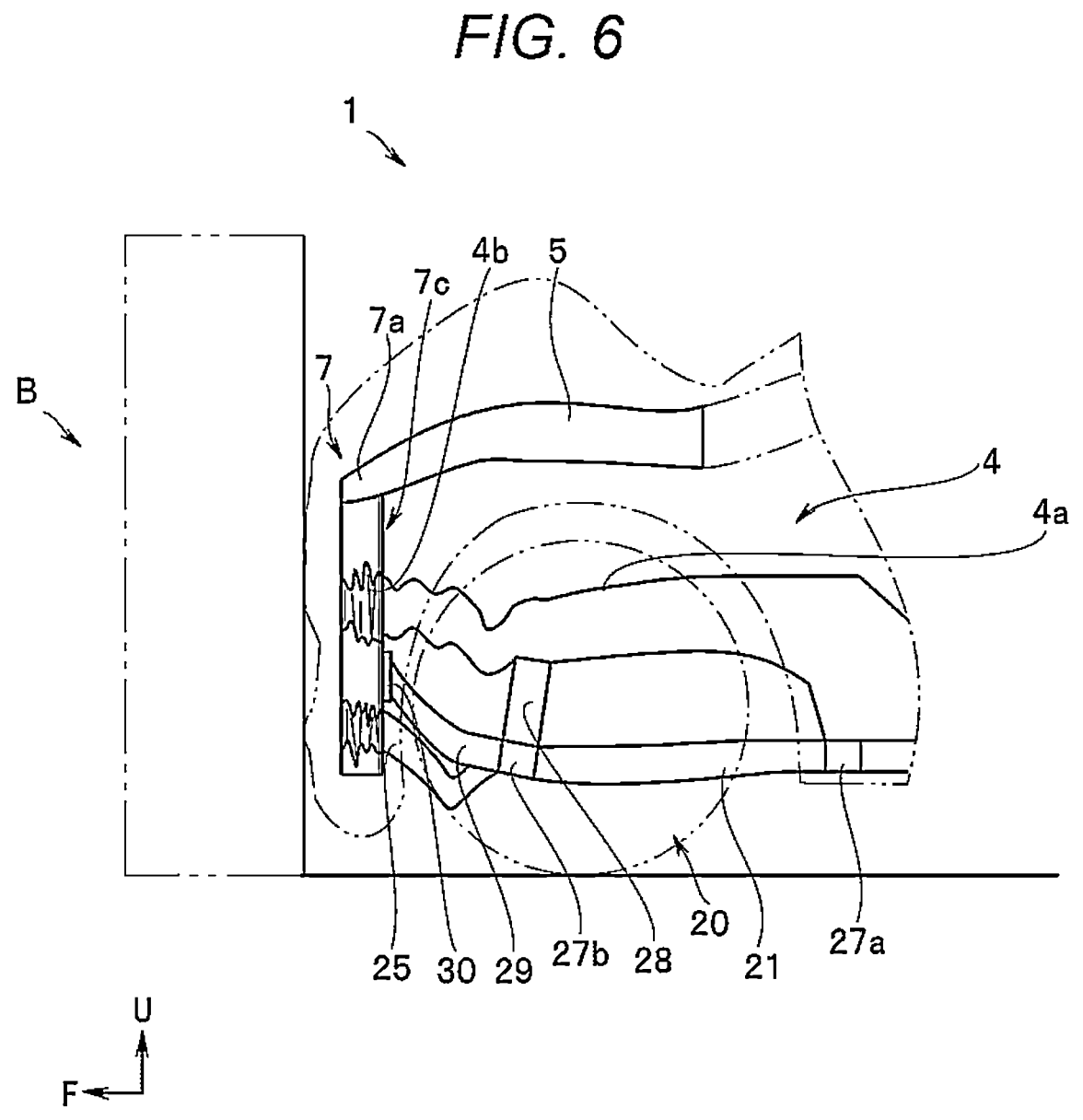

With such a configuration, as illustrated in FIGS. 5 and 6, when the vehicle body 1 makes a full-wrap frontal collision against a barrier obstacle B, each lower side frame extension member 25 and each gusset 29 stiffen a region in front of the lower frame 20 by reaction force of the lower frame 20 supported by the front side frame 4. By the operation of the lower side frame extension members 25 and the gussets 29, the vehicle body front structure of the present embodiment can generate a higher resistance on the vehicle body 1 as compared with the vehicle body front structure including only the front side frames 4.

For example, the lower side frame extension member 25 that stiffens the front portion of the vehicle body together with the front side frame 4 is deformed together with the crash box 4*b* from the initial stage of the full-wrap frontal collision to the middle stage of the collision (see FIG. 5). Thus, the lower side frame extension member 25 can absorb, together with the crash box 4*b*, a collision load from the initial stage of the full-wrap frontal collision to the middle stage of the collision.

At a final stage of the full-wrap frontal collision (see FIG. 6) after the crash box 4*b* has been fully deformed, the gusset 29 is deformed together with the front side frame 4 and the lower side frame extension member 25. Thus, each gusset 29 can absorb the collision load of the front portion of the vehicle body together with the front side frame 4 and the lower side frame extension member 25.

In this state, the lower side frame extension members 25 and the gussets 29 transmit collision energy from the front portion of the vehicle body to the lower frame 20. Part of the collision energy transmitted to the lower frame 20 is transmitted to each of the front side frames 4 supporting the lower frame 20.

That is, the lower frame 20 can distribute the collision energy transmitted from each of the lower side frame extension members 25 and each of the gussets 29 to each of the front side frames 4.

Figure 7:
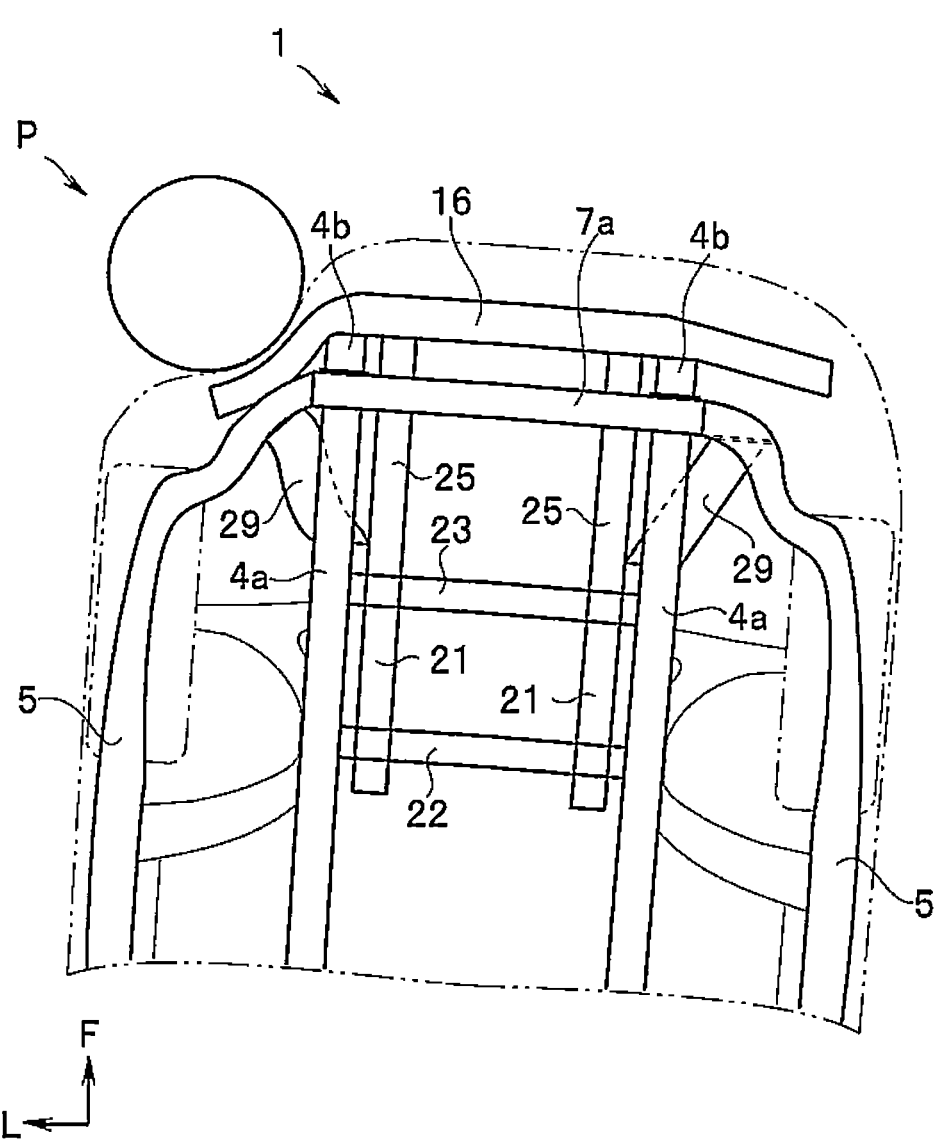
FIG. 7 is a plan view illustrating behavior of the frame of the front portion of the vehicle body at an initial stage of a small-overlap frontal collision.
Figure 8:
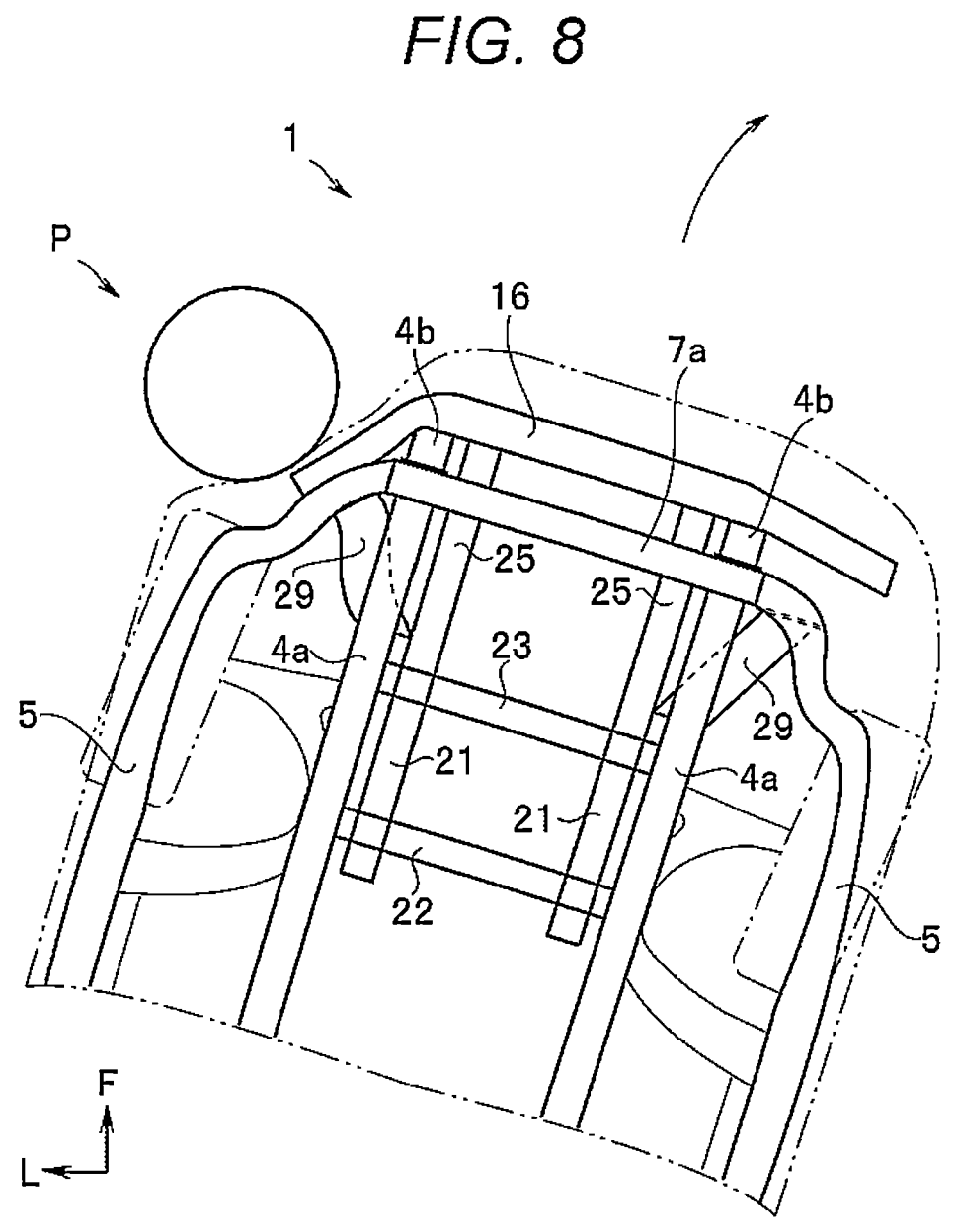
Figure 9:
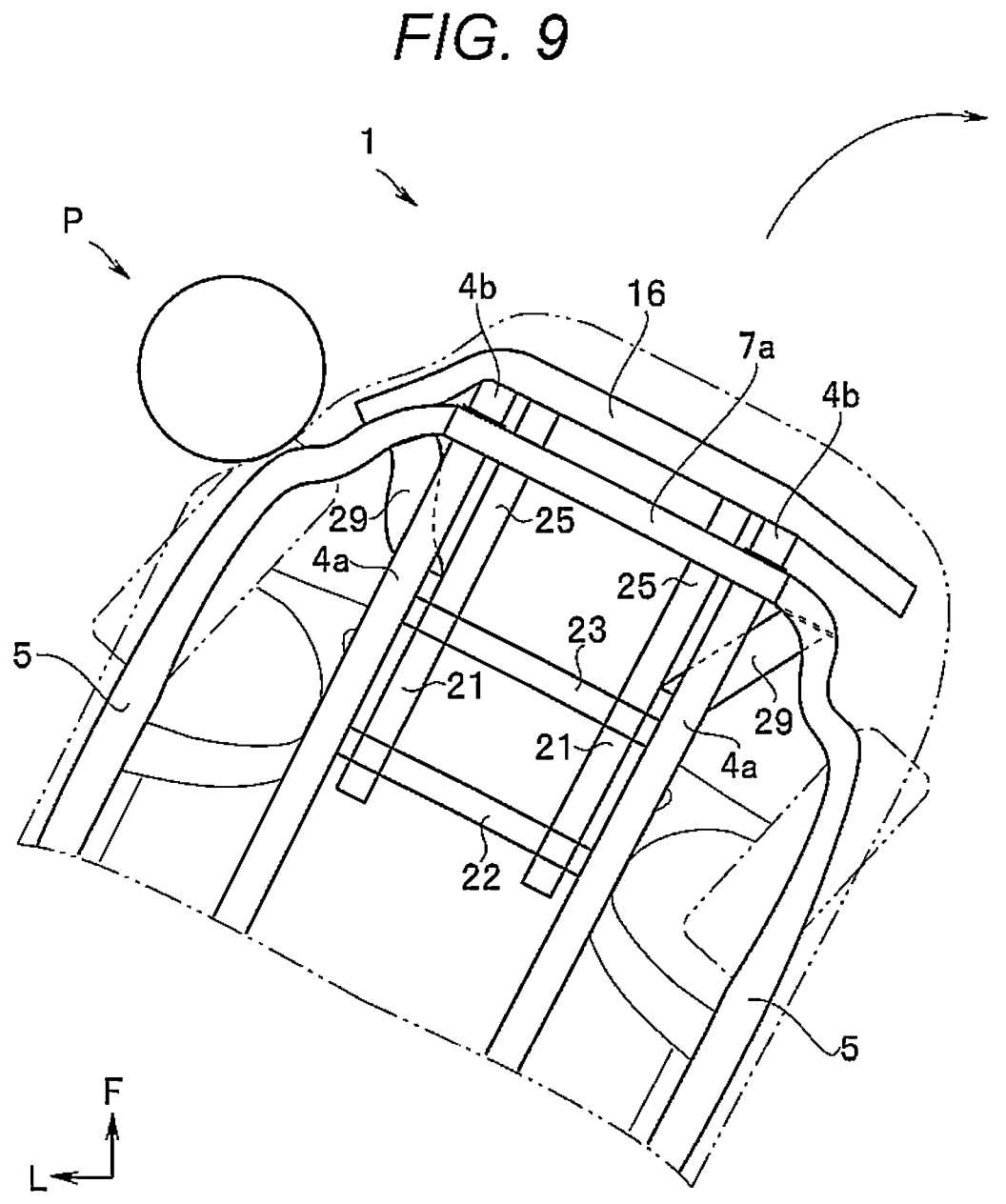

On the other hand, as illustrated in FIGS. 7, 8, and 9, for example, when a left end portion of the vehicle body 1 comes into small-overlap frontal collision with a pole-shaped obstacle P, the gusset 29 stiffens the region outside the front side frame 4 in the vehicle width direction by the reaction force of the lower frame 20. Thus, the gusset 29 generates a resistance for suppressing deformation of a region outside the front side frame 4 in the vehicle width direction.

For example, the front end of the gusset 29 is disposed outside the front end of the front side frame 4 in the vehicle width direction. Therefore, the gusset 29 can stiffen a region outside the front side frame 4 in the vehicle width direction at the initial stage of the small-overlap frontal collision (see FIG. 7).

Furthermore, at the middle stage of the small-overlap frontal collision (see FIG. 8), the collision load not absorbed by the resistance of the gusset 29 is converted into a yawing moment for rotating the vehicle body 1 rightward using a contact portion between the pole-shaped obstacle P and the gusset 29 as a fulcrum.

At the final stage of the small-overlap frontal collision (see FIG. 9), the clockwise yawing moment triggers the pole-shaped obstacle P to pass through the upper side frame 5 while being guided outward in the vehicle width direction of the upper side frame 5. Thus, the vehicle body 1 is released from the collision load of the pole-shaped obstacle P.

Thus, the vehicle body front structure of the present embodiment can suppress deformation of the vehicle body 1 in both the full-wrap frontal collision and the small-overlap frontal collision.

In addition, each of the lower side frame extension members 25 extends obliquely upward from the rear end to the front end of the lower side frame extension member 25. Each of the extended lower side frame extension members 25 is joined in the frame of the radiator support 7. A middle portion of the lower side frame extension member 25 extended in this manner is bent downward of the vehicle body 1 by a collision load in the full-wrap frontal collision (see FIGS. 5 and 6).

For example, each of the lower side frame extension members 25 is joined in the frame of the radiator support 7 in a state of being inclined upward toward the front side of the vehicle body. By the operation of the inclination of the lower side frame extension members 25, for example, in the full-wrap frontal collision, each of the lower side frame extension members 25 can allow a collision load to be concentrated on the middle portion of each of the lower side frame extension members 25. The collision load concentrated on the middle portion of each lower side frame extension member 25 can deform the lower side frame extension member 25 toward the lower side of the vehicle body 1 starting from the middle portion of the lower side frame extension member 25.

That is, the vehicle body front structure including the lower side frame extension member 25 can more effectively absorb the collision load due to the deformation of the lower side frame extension member 25 in the full-wrap frontal collision. Note that, in order to properly deform the middle portion of the lower side frame extension member 25 at the time of collision, various conditions such as an inclination angle of the lower side frame extension member 25 and a plate thickness and a shape of the lower side frame extension member 25 are obtained in advance from experiments, simulations, and the like.

The coupling member 28 for coupling the lower frame 20 and each of the front side frames 4 is disposed in front of each suspension tower 6. Each of the coupling members 28 disposed as described above is restricted from moving toward the rear side of the vehicle body by the suspension tower 6. Therefore, each of the coupling members 28 can further increase the reaction force of the lower frame 20 against the collision load from the front of the lower frame 20. Thus, the vehicle body front structure including the coupling member 28 can generate a higher resistance on the vehicle body 1 in the full-wrap frontal collision.

Further, each gusset 29 is disposed outside the lower side frame extension member 25 in the vehicle width direction and at the front portion of the coupling member 28. For example, in each gusset 29, the rear portion of each gusset 29 is joined to the front surface of the support member 27*b*. Therefore, movement of each of the support members 27*b* toward the rear side of the vehicle body is restricted by the suspension tower 6, as is the coupling members 28 coupled to the upper surfaces of the support members 27*b*. Thus, each gusset 29 can obtain a high reaction force from the support member 27*b* against both the full-wrap frontal collision and the small-overlap frontal collision. That is, the vehicle body front structure including the gusset 29 can generate a higher resistance on the vehicle body 1 in both the full-wrap frontal collision and the small-overlap frontal collision.

The front end of each gusset 29 is disposed lower than the front end of the front side frame 4 and higher than the front end of the lower side frame extension member 25.

For example, the front end of each gusset 29 is disposed between the front end of the front side frame 4 and the front end of the lower side frame extension member 25 in the vehicle body up-down direction, and is disposed outside the front end of the front side frame 4 in the vehicle width direction. That is, the front end of each gusset 29 is dispersedly disposed around the radiator support 7 together with the front end of the front side frame 4 and the front end of the lower side frame extension member 25.

Therefore, each gusset 29 disposed in this manner can exert a sufficient resistance on a wide region of the front portion of the vehicle body together with the front side frame 4 and the lower side frame extension member 25 in a frontal collision such as a full-wrap frontal collision.

Note that the vehicle body front structure according to the present embodiment is also applicable to, for example, an offset frontal collision between the full-wrap frontal collision and the small-overlap frontal collision.

The disclosure described in the above-described embodiment is not limited to the embodiment. In the stage of implementation, various modifications can be implemented within the scope not departing from the idea of the disclosure. Further, the above-described embodiment includes disclosures in various stages. Various disclosures can be extracted from appropriate combinations of the disclosed multiple components.

Further, for example, even though some components are deleted from all the components described in the embodiment, the configuration from which the components are deleted can be extracted as a disclosure as long as the described problem can be solved, and the described effect can be obtained.

The invention claimed is:

1. A vehicle body front structure comprising:
   front side frames in a pair extending in a front-rear direction of a vehicle body on a left side and a right side of the vehicle body respectively;
   upper side frames in a pair disposed respectively on both sides of a power unit room in a vehicle width direction and extending along the power unit room;
   a radiator support disposed in a front portion of the power unit room and joined to respective front ends of the upper side frames; and
   a lower frame disposed below the front side frames and supported by the front side frames, wherein
   the vehicle body front structure comprises:
   lower side frame extension members in a pair, the lower side frame extension members extending from a front end of the lower frame toward a front side of the vehicle body and having a front end portion protruding forward of the radiator support; and
   gussets in a pair, the gussets extending from the front end of the lower frame toward the front side of the vehicle body and each having a front end disposed outside a front end of a corresponding one of the front side frames in the vehicle width direction.

2. The vehicle body front structure according to claim 1, wherein the lower side frame extension members are disposed inward from the front side frames in the vehicle width direction respectively, and front ends of the lower side frame extension members are inclined upward toward the front side and pass through a frame of the radiator support.

3. The vehicle body front structure according to claim 1, further comprising:
   a suspension tower that supports a suspension apparatus between one of the front side frames and a corresponding one of the upper side frames; and
   a coupling member that couples the lower frame to the front side frames at a front portion of the suspension tower.

4. The vehicle body front structure according to claim 2, further comprising:
   a suspension tower that supports a suspension apparatus between one of the front side frames and a corresponding one of the upper side frames; and
   a coupling member that couples the lower frame to the front side frames at a front portion of the suspension tower.

5. The vehicle body front structure according to claim 3, wherein a rear portion of each of the gussets is disposed outside a corresponding one of the lower side frame extension members in the vehicle width direction and at a front portion of the coupling member.

6. The vehicle body front structure according to claim 4, wherein a rear portion of each of the gussets is disposed outside a corresponding one of the lower side frame extension members in the vehicle width direction and at a front portion of the coupling member.

7. The vehicle body front structure according to claim 2, wherein the front end of each of the gussets is disposed lower than a front end of the corresponding one of the front side frames and higher than a front end of the corresponding one of the lower side frame extension members in an up-down direction of the vehicle body.

* * * * *